UNITED STATES PATENT OFFICE.

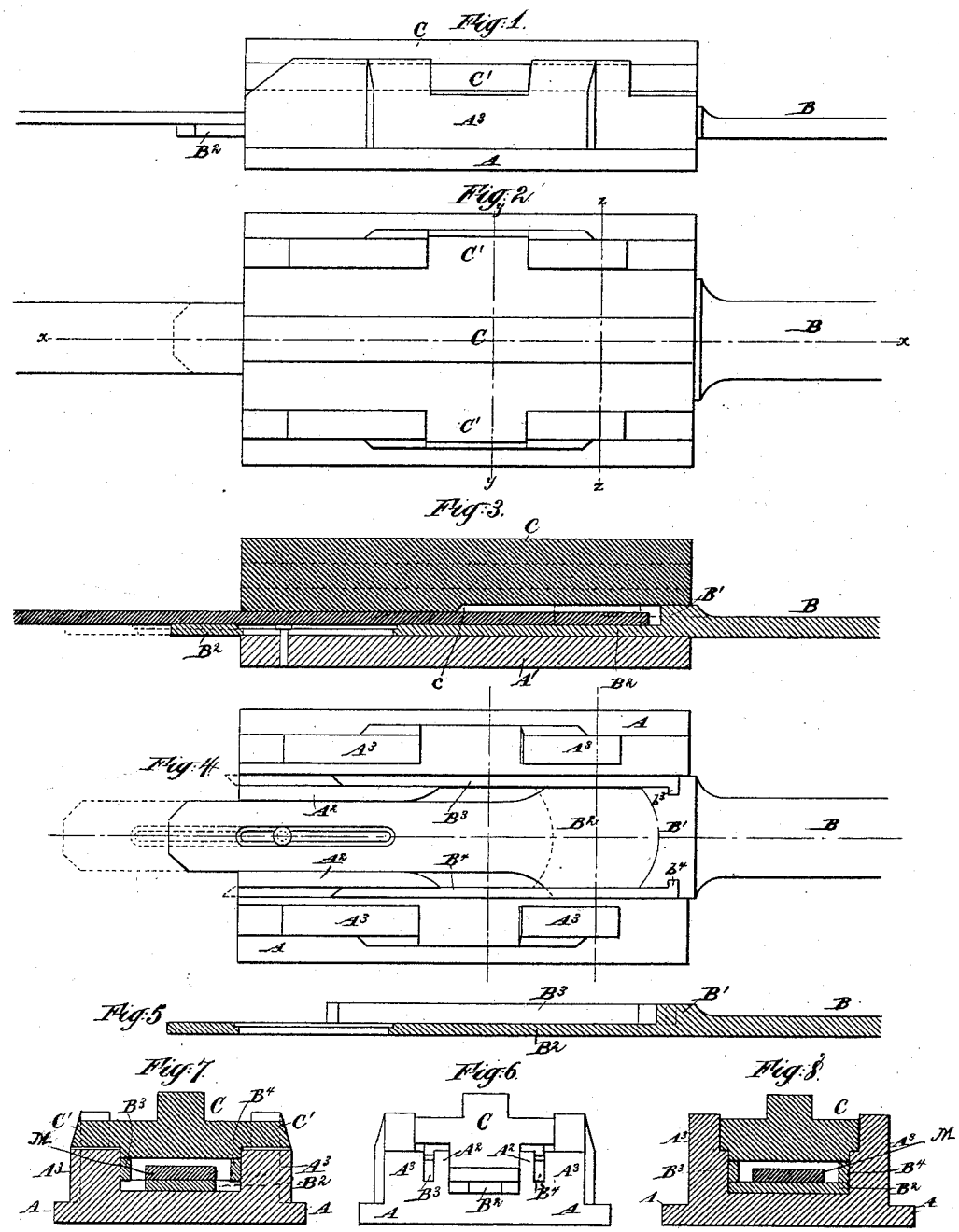

WATTS COOKE AND DANIEL CARLOUGH, OF PATERSON, NEW JERSEY.

MACHINE FOR UPSETTING EYE-BARS.

SPECIFICATION forming part of Letters Patent No. 328,290, dated October 13, 1885.

Application filed February 18, 1885. Serial No. 156,265. (No model.)

*To all whom it may concern:*

Be it known that we, WATTS COOKE and DANIEL CARLOUGH, both citizens of the United States, residing at Paterson, Passaic county, in the State of New Jersey, have invented certain new and useful Improvements in the Manufacture of Eye-Bars; and we do hereby declare that the following is a full and exact description thereof.

Eye-bars extensively used as ties in bridges, roofs, &c., are of wrought-iron, larger at each end than in the middle. Economy requires that the bars be rolled of suitable section for the bodies and the ends enlarged by some means. The ordinary way of enlarging includes the welding on of additional iron at each end. We have discovered that by providing an excess of length and compressing the terminal portions endwise, technically known as "upsetting," and taking proper care to avoid folds and preserve the straight condition of the iron, enlarged ends can be produced of greater uniformity and strength. We have devised a machine which accomplishes these ends rapidly and cheaply.

Our machine receives the heated bar and holds it firmly with its end in a box-die or hollow space of proper width, in which it is subjected to the action of a ram impelled by steam and abutting against the end of the bar and compressing the metal endwise until it is upset and fills the die. We prefer to upset too much and afterward reduce a little by hammering; but this may not be essential to success. The machine is worked horizontally. Difficulties have been encountered from the friction of the hot metal against the confining-surfaces at the top, bottom, and sides. We have devised means for reducing the difficulty from this source. Our machine involves little complication or expense. A plate which shapes the bottom face of the eye is attached to the moving part or ram, and moves with it. A recess is made in the bed of the die to allow for this plate. The provisions in regard to width are peculiar, and will be detailed presently. We also connect to the ram two narrower pieces, which shape, respectively, the edges of the eye. These are peculiarly attached, and peculiar provisions are made for their end motions. The upper face of the eye is shaped by a cover, which does not move with the ram, but yields upward when required. It is afterward removed to allow the bar, with its enlarged end or eye fully formed, to be lifted out and a new one introduced. It will be seen that our upsetting is accomplished by making a portion of the die move with the ram while another portion is stationary with the bed, and a third portion is yielding and removable.

The accompanying drawings form a part of this specification, and represent what we consider the best means of carrying out the invention.

Figure 1 is a side elevation. Fig. 2 is a plan view. Fig. 3 is a longitudinal vertical section on the line $x\,x$ in Fig. 2. Fig. 4 is a plan view corresponding to Fig. 2, but with a portion removed. Fig. 5 is a longitudinal vertical section of a detail. Fig. 6 is an end view. Fig. 7 is a transverse section on the line $y\,y$ in Fig. 2, and Fig. 8 is a corresponding section on the line $z\,z$.

Similar letters of reference indicate like parts in all the figures where they occur.

A indicates the stationary parts or anvil. We will use additional marks, as $A'\,A^2$, when necessary to indicate certain portions thereof. $A'$ is the base. $A^2\,A^2$ are strong parts, arranged to shape the shoulders, or the junction of the eye with the body of the eye-bar.

Sides $A^3$ stand parallel to the parts $A^2$. They extend along the length of the die. A space is left each side between $A^2$ and $A^3$. All these fixed parts are strongly and rigidly united. We have in our experiments made them a single piece of iron or steel.

B is the moving part, certain portions being designated, when necessary, by additional marks, as $B'\,B^2$.

$B'$ is the ram or head, which is forced against the end.

$B^2$ is the bottom plate, which shapes the lower face of the eye.

$B^3$ and $B^4$ are side pieces, which shape the edges of the eye. The bottom plate, $B^2$, is formed in one piece with or is fixed to the head $B'$. The bottom plate is wider than the eye for a distance equal to the length of the finished eye. The extension is contracted in width.

The parts $B^3$ and $B^4$ are separate pieces of iron or steel provided with short arms or offsets $b^3 b^4$, which engage in recesses in the sides of the head B'. They constitute a portion of the moving die; but their forms and mode of attachment allow them to yield to the expansive force to which they are subjected, pressing out against the adjacent sides $A^3$ when subject to the distending pressure of the hot metal, and yielding inward a little to offer less friction when not thus distended.

The top piece, C, is engaged with the bed by strong wings C' C'. It is capable of rising and sinking. It is removed after each operation to allow the bar to be lifted out, and is replaced after a fresh bar is introduced. Its form matches down between the parts $A^2 A^2$ and $A^3 A^3$, as shown. It has a beveled offset at c, which, by inducing the formation of a corresponding offset on the eye, we believe is of advantage. It is important to preserve the strength to the utmost in the neck or junction of the eye with the body of the bar. The form shown is successful.

We propose to hold down the cover C by the pressure of water acting on a piston connected to the cover, and to release the water by degrees when the pressure of the metal becomes excessive. The attendant may control this by a cock or valve, keeping in the water or liberating it as the conditions in each case shall seem to require. The device is well known and need not be described in detail.

To operate the invention a short heat is taken on the end of the bar M, and it is laid between $A^2 A^2$, extending beyond to abut against the ram B. The remainder of the bar is kept cool, and rests against a strong abutment (not shown) at the opposite end, and is, by means not shown, clamped so as to maintain its straight condition. Such abutment and clamps are well known. The pressure of steam acting in a cylinder (not shown) is applied to force the moving die, composed of the ram B', bottom $B^2$, and pieces $B^3 B^4$, endwise. This upsets the iron and causes the portion within the die to increase its width and thickness until the die is filled or about filled. Then the ram and its attachments are withdrawn and the cover is removed, the bar, with the material widened and thickened for the eye, removed, a fresh bar properly heated introduced, the cover reapplied, and the operation is repeated.

In practice we find that the bars will not be forced into the spaces upon either side of the part $B^2$ of the ram B to any considerable extent. Any slight projection from this cause is easily remedied.

Modifications may be made in the proportions without departing from the principle or sacrificing the advantages of the invention. The working-face of the ram B' may be hollowed instead of plane, as shown.

Parts of the invention may be used without the whole. We can make the side pieces, $B^3 B^4$, in a single piece with the ram B', or they may be made in separate pieces and firmly bolted; but the loose engagement described is important, for the reason that such construction allows the parts to move without appreciable resistance when the side pieces are not crowded outward by the upsetting of the iron within. When the latter occurs and the side pieces are forced outward strongly, the looseness of their engagement allows them to move outward freely until they are supported by a fair pressure against the inclosing-sides $A^3$, then, being thus supported, they resist any amount of distending strain. We can effect the subsequent slight drawing of the eye by rolling instead of hammering.

We claim as our invention—

1. An upsetting-machine having a portion of the confining-surfaces moving with the ram, and another portion of such surfaces stationary with the bed, substantially as herein specified.

2. In an upsetting-machine, the bottom plate, $B^2$, and side pieces, $B^3 B^4$, attached to the ram B' and moving therewith, as herein specified.

3. In an upsetting-machine, the edge pieces, $B^3 b^3 B^4 b^4$, engaged loosely with the ram B', so as to move therewith, while free for lateral expansion and contraction to a limited extent, as herein specified.

4. In an upsetting-machine, the bed or anvil A, having fixed sides $A^2$ and removable top piece, C C', in combination with each other and with the ram B', bottom plate, $B^2$, and loose side pieces, $B^3 b^3 B^4 b^4$, arranged for joint operation relatively to each other and to an inclosed bar, M, of heated metal, as herein specified.

In testimony whereof we have hereunto set our hands, at Paterson, New Jersey, this 6th day of February, 1885, in the presence of two subscribing witnesses.

WATTS COOKE.
DANIEL CARLOUGH.

Witnesses:
J. H. BLAUVETT,
O. A. HOWE, Jr.